(12) United States Patent
Deng et al.

(10) Patent No.: US 10,028,216 B2
(45) Date of Patent: Jul. 17, 2018

(54) DATA TRANSCEIVING METHOD, MODEM, AND TERMINAL DEVICE

(71) Applicant: Huawei Technologies Co., Ltd., Shenzhen (CN)

(72) Inventors: Yu Deng, Shanghai (CN); Konggang Wei, Shenzhen (CN); Yu Peng, Shanghai (CN)

(73) Assignee: Huawei Technologies Co., Ltd. (CN)

( * ) Notice: Subject to any disclaimer, the term of this patent is extended or adjusted under 35 U.S.C. 154(b) by 14 days.

(21) Appl. No.: 15/128,091

(22) PCT Filed: Jul. 24, 2014

(86) PCT No.: PCT/CN2014/082959
§ 371 (c)(1),
(2) Date: Sep. 21, 2016

(87) PCT Pub. No.: WO2016/011648
PCT Pub. Date: Jan. 28, 2016

(65) Prior Publication Data
US 2017/0094593 A1    Mar. 30, 2017

(51) Int. Cl.
*G08C 17/00* (2006.01)
*H04W 52/02* (2009.01)
*H04L 29/06* (2006.01)

(52) U.S. Cl.
CPC ......... *H04W 52/0203* (2013.01); *H04L 69/22* (2013.01); *H04L 2212/00* (2013.01)

(58) Field of Classification Search
CPC combination set(s) only.
See application file for complete search history.

(56) References Cited

U.S. PATENT DOCUMENTS 9,258,834 B2 * 2/2016 Sheng .............. H04B 1/0028
2007/0286222 A1   12/2007 Balasubramanian
(Continued)

FOREIGN PATENT DOCUMENTS

| CN | 102547935 A | 7/2012 |
|---|---|---|
| CN | 103813421 A | 5/2014 |

(Continued)

OTHER PUBLICATIONS

International Search Report in International Application No. PCT/CN2014/082959 dated May 4, 2015, 4 pages.
(Continued)

*Primary Examiner* — Frank Duong
(74) *Attorney, Agent, or Firm* — Fish Richardson P.C.

(57) ABSTRACT

Embodiments of the present disclosure resolve problem of power consumption caused because an AP is frequently woken up. This solution includes: receiving, by a modem, pre-processing information, which is sent by an application processor AP, of an application, where the pre-processing information includes at least a period range value and first data that are of the application, the period range value is used to represent frequency at which the application needs the AP to send and receive the first data, and the first data is data that the application needs the AP to send to a server; invoking, by the modem, preset functions according to the period range value and a time at which the modem receives the pre-processing information, to determine a sending time of the first data; and sending, by the modem, the first data to the server according to the sending time.

20 Claims, 6 Drawing Sheets

(56) References Cited

U.S. PATENT DOCUMENTS

| | | | |
|---|---|---|---|
| 2010/0069127 A1* | 3/2010 | Fiennes | H04W 52/028 455/574 |
| 2012/0117401 A1* | 5/2012 | Gobriel | G06F 1/3209 713/320 |
| 2012/0188928 A1* | 7/2012 | Wang | H04L 43/0811 370/311 |
| 2013/0308511 A1 | 2/2013 | Box | |
| 2014/0143575 A1* | 5/2014 | Ansley | H04W 52/0235 713/323 |
| 2014/0378176 A1* | 12/2014 | Ning | H04W 4/14 455/466 |
| 2016/0164990 A1* | 6/2016 | Zhang | H04W 52/0229 709/206 |
| 2017/0289075 A1* | 10/2017 | Hu | H04L 51/04 |

FOREIGN PATENT DOCUMENTS

| | | |
|---|---|---|
| CN | 103843418 A | 6/2014 |
| EP | 2698963 A1 | 2/2014 |
| WO | 2012128792 A1 | 9/2012 |
| WO | 2013032237 A1 | 3/2013 |
| WO | 2013170896 A1 | 11/2013 |

OTHER PUBLICATIONS

Extended European Search Report issued in European Application No. 14898260.6 dated May 5, 2017, 9 pages.

\* cited by examiner

US 10,028,216 B2

DATA TRANSCEIVING METHOD, MODEM, AND TERMINAL DEVICE

CROSS-REFERENCE TO RELATED APPLICATIONS

This application is a National Stage of International Application No. PCT/CN2014/082959, filed on Jul. 24, 2014, which is hereby incorporated by reference in its entirety.

TECHNICAL FIELD

The present invention relates to the communications field, and in particular, to a data transceiving method, a modem, and a terminal device.

BACKGROUND

With evolution and coverage improvement of access technology High-Speed Packet Access (HSPA) and Long Term Evolution (LTE) protocols, the mobile Internet is widely applied to a terminal device. The terminal device generally includes an application processor (AP) and a modem. The AP may be configured to process a user interface and run an application program, and the modem may be configured to process transceiving of wireless network data.

Usually, when the terminal device needs to send and receive the wireless network data, the AP may run the application program and invoke an interface to control the modem to send and receive the wireless network data, and further completes interaction with a server. For example, in an instant messaging scenario, to ensure that a Transmission Control Protocol (TCP) persistent connection is maintained between instant messaging software and the server, the instant messaging software wakes up the AP according to a time interval, so that the AP controls the modem to send and receive the wireless network data. In an email transceiving scenario, an email box application program generally wakes up the AP at a regular interval according to different email box protocol types, so that the AP controls the modem to detect whether the server receives a new email.

However, in the foregoing process in which the AP controls the modem to send and receive the wireless network data, the AP is frequently woken up to control the modem to send and receive the wireless network data. Therefore, the AP is in an operating state for a long time, causing relatively large power consumption of the terminal device.

SUMMARY

Embodiments of the present invention provide a data transceiving method, a modem, and a terminal device, resolving a prior-art problem of relatively large power consumption of a terminal device caused because an AP is frequently woken up to control a Modem to send and receive wireless network data.

To achieve the foregoing objective, the following technical solutions are used in the embodiments of the present invention:

According to a first aspect, an embodiment of the present invention provides a data transceiving method, where the method includes:

receiving, by a modem, pre-processing information, which is sent by an application processor AP, of an application, where the pre-processing information includes at least a period range value and first data that are of the application, the period range value is used to represent frequency at which the application needs the AP to send and receive the first data, and the first data is data that the application needs the AP to send to a server;

invoking, by the modem, preset functions according to the period range value and a time at which the modem receives the pre-processing information, to determine a sending time of the first data; and sending, by the modem, the first data to the server according to the sending time.

In a first possible implementation manner of the first aspect, the preset functions include a first preset function and a second preset function; and the sending time includes a sending moment and a sending period, where the first preset function is used to determine the sending moment, the second preset function is used to determine the sending period, and the second preset function and the first preset function have a same decomposition factor, where the invoking, by the modem, preset functions according to the period range value and a time at which the modem receives the pre-processing information, to determine a sending time of the first data includes:

recording, by the modem, the time at which the modem receives the pre-processing information;

invoking, by the modem, the first preset function according to the time and the period range value, to determine the sending moment; and invoking, by the modem, the second preset function according to the period range value, to determine the sending period.

With reference to the first aspect and the first possible implementation manner of the first aspect, in a second possible implementation manner of the first aspect, the sending, by the modem, the first data to the server according to the sending time includes:

periodically sending, by the modem, the first data to the server according to the sending period starting from the sending moment.

With reference to the second possible implementation manner of the first aspect, in a third possible implementation manner of the first aspect, the sending, by the modem, the first data to the server according to the sending time includes:

encapsulating, by the modem, the first data in a TCP/IP protocol stack, to obtain a first packet; and periodically sending, by the modem by using a 3GPP protocol stack, the first packet to the server according to the sending period starting from the sending moment.

With reference to the third possible implementation manner of the first aspect, in a fourth possible implementation manner of the first aspect, after the encapsulating, by the modem, the first data in a TCP/IP protocol stack, to obtain a first packet, the method further includes:

invoking, by the modem, an encryption algorithm, to encrypt the first packet.

With reference to any one of the first aspect and the first to fourth possible implementation manners of the first aspect, in a fifth possible implementation manner of the first aspect, the pre-processing information further includes a terminal identifier and a data characteristic that are of a terminal device corresponding to the modem, and the data characteristic is an expected characteristic of data with which the server replies to the first data; and after the sending, by the modem, the first data to the server according to the sending time, the method further includes:

receiving, by the modem, a reply packet sent by the server, where the reply packet is generated after the server parses the first data;

if a terminal identifier in the reply packet is the same as the terminal identifier, parsing, by the modem, the reply packet, to obtain reply data; and if the reply data conforms to the data characteristic, entering, by the modem, a standby state.

With reference to the fifth possible implementation manner of the first aspect, in a sixth possible implementation manner of the first aspect, after the receiving, by the modem, a reply packet sent by the server, the method further includes:

if the terminal identifier in the reply packet is different from the terminal identifier, sending, by the modem, the reply packet to the AP.

With reference to the fifth possible implementation manner of the first aspect, in a seventh possible implementation manner of the first aspect, after the parsing, by the modem, the reply packet, to obtain reply data, the method further includes:

if the reply data does not conform to the data characteristic, generating, by the modem, first anomaly information of the application, and sending the first anomaly information to the AP.

With reference to any one of the first aspect and the first to fourth possible implementation manners of the first aspect, in an eighth possible implementation manner of the first aspect, after the sending, by the modem, the first data to the server according to the sending time, the method further includes:

if the reply packet sent by the server is not received within a preset time, generating, by the modem, second anomaly information of the application, and sending the second anomaly information to the AP, where the reply packet is generated after the server parses the first data.

According to a second aspect, an embodiment of the present invention provides a modem, including:

a receiving unit, configured to receive pre-processing information, which is sent by an application processor AP, of an application, where the pre-processing information includes at least a period range value and first data that are of the application, the period range value is used to represent frequency at which the application needs the AP to send and receive the first data, and the first data is data that the application needs the AP to send to a server;

a processing unit, configured to invoke preset functions according to the period range value in the receiving unit and a time at which the receiving unit receives the pre-processing information, to determine a sending time of the first data; and a sending unit, configured to send the first data in the receiving unit to the server according to the sending time determined in the processing unit.

In a first possible implementation manner of the second aspect, the processing unit is specifically configured to record the time at which the receiving unit receives the pre-processing information; invoke a first preset function according to the time and the period range value in the receiving unit, to determine a sending moment; and invoke a second preset function according to the period range value in the receiving unit, to determine a sending period; and the preset functions include the first preset function and the second preset function; and the sending time includes the sending moment and the sending period, where the first preset function is used to determine the sending moment, the second preset function is used to determine the sending period, and the second preset function and the first preset function have a same decomposition factor.

With reference to the first possible implementation manner of the second aspect, in a second possible implementation manner of the second aspect, the sending unit is specifically configured to periodically send the first data in the receiving unit to the server according to the sending period starting from the sending moment determined by the processing unit.

With reference to the second possible implementation manner of the second aspect, in a third possible implementation manner of the second aspect, the sending unit further includes an encapsulation subunit;

the encapsulation subunit is configured to encapsulate the first data in a TCP/IP protocol stack, to obtain a first packet; and the sending unit is specifically configured to periodically send, by using a 3GPP protocol stack, the first data in the receiving unit to the server according to the sending period starting from the sending moment determined by the processing unit.

With reference to the third possible implementation manner of the second aspect, in a fourth possible implementation manner of the second aspect, the sending unit further includes an encryption subunit; and the encryption subunit is configured to invoke an encryption algorithm, to encrypt the first packet in the encapsulation subunit.

With reference to any one of the second aspect and the first to fourth possible implementation manners of the second aspect, in a fifth possible implementation manner of the second aspect, the receiving unit is further configured to receive a reply packet sent by the server, where the reply packet is generated after the server parses the first data;

the processing unit is further configured to: if a terminal identifier in the reply packet is the same as the terminal identifier, parse the reply packet in the receiving unit, to obtain reply data; and if the reply data conforms to a data characteristic, enter a standby state; and the pre-processing information further includes a terminal identifier and a data characteristic that are of a terminal device corresponding to the modem, and the data characteristic is an expected characteristic of data with which the server replies to the first data.

With reference to the fifth possible implementation manner of the second aspect, in a sixth possible implementation manner of the second aspect, the sending unit is further configured to: if the terminal identifier in the reply packet is different from the terminal identifier, send the reply packet in the receiving unit to the AP.

With reference to the fifth possible implementation manner of the second aspect, in a seventh possible implementation manner of the second aspect, the processing unit is further configured to: if the reply data does not conform to the data characteristic, generate first anomaly information of the application; and the sending unit is further configured to send the first anomaly information in the processing unit to the AP.

With reference to any one of the second aspect and the first to fourth possible implementation manners of the second aspect, in an eighth possible implementation manner of the second aspect, the processing unit is further configured to: if the reply packet sent by the server is not received within a preset time, generate second anomaly information of the application; and the sending unit is further configured to send the second anomaly information in the processing unit to the AP, where the reply packet is generated after the server parses the first data.

According to a third aspect, an embodiment of the present invention provides a terminal device, where the terminal device includes the modem in any one of the second aspect and the first to eighth possible implementation manners of the second aspect and an application processor AP connected to the modem.

Embodiments of the present invention provide a data transceiving method, a modem, and a terminal device. The modem receives pre-processing information, which is sent by an AP, of an application, to determine a sending time of the application and send the sending time to a server. This process only needs to wake up the AP each time the application is started or each time a user logs in, thereby greatly reducing a quantity of times of waking up the AP, and further reducing power consumption of the terminal device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

Embodiment 1

Figure 1:
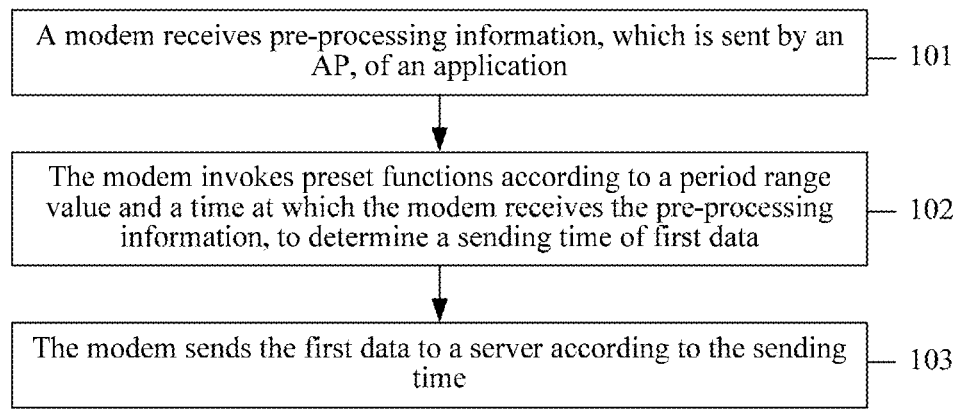
FIG. 1 is a schematic flowchart 1 of a data transceiving method according to an embodiment of the present invention.

An embodiment of the present invention provides a data transceiving method, as shown in FIG. 1, including:

101: A modem receives pre-processing information, which is sent by an AP, of an application.

The foregoing pre-processing information includes at least a period range value and first data that are of the application, where the period range value is used to represent frequency at which the application needs the AP to send and receive the first data, and the first data is data that the application needs the AP to send to a server. For example, the first data may be a heartbeat packet that needs to be sent to the server when the AP detects whether the application is online. In this embodiment of the present invention, the AP sends the heartbeat packet to the modem, so that the modem sends the heartbeat packet to the server, to further reduce a quantity of times of waking up the AP, and to further reduce overall power consumption of a terminal device.

Exemplarily, the period range value may be represented by n, and a value of n may range from 0 to 10. When n=1, it indicates that the frequency at which the application needs the AP to send and receive the first data is relatively small. For example, email box software acquires email arrival information at a regular interval. In this case, the frequency at which the AP sends and receives the first data may be once every several minutes. When n=1, it indicates that the frequency at which the application needs the AP to send and receive the first data is relatively large. For example, instant messaging software periodically detects whether a user is online. In this case, the frequency at which the AP sends and receives the first data may be once every several seconds.

Optionally, a general control such as a TCP/IP protocol stack, or an SSL security module is transferred in the modem, so that the modem has capabilities, which the AP has, of packetizing and depacketizing data. The AP sends the pre-processing information of the application to the modem by using a provided application programming interface (API). When a sending period of the first data in the pre-processing information arrives, the modem may packetize data according to content in the first data and a corresponding communications protocol, and sends the packetized first data to the server. In this way, the API configuration interface only needs to be invoked each time the application is started or each time a user logs in, and the AP does not need to be woken up during normal use to perform setting.

102: The modem invokes preset functions according to a period range value and a time at which the modem receives the pre-processing information, to determine a sending time of first data.

The preset functions include a first preset function and a second preset function; and the sending time includes a sending moment and a sending period, where the first preset function is used to determine the sending moment, the second preset function is used to determine the sending period, and the second preset function and the first preset function have a same decomposition factor.

When step 101 is performed and the modem receives the pre-processing information, the time in this case, that is, a time at which the modem receives the pre-processing information, may be recorded. It should be noted that the time at which the modem receives the pre-processing information is merely used to reflect the receiving moment, and a representation form of the receiving moment is not limited in this embodiment of the present invention. For example, the receiving moment may be recorded as an $N^{th}$ cadence value according to a timing mechanism established inside the Modem.

When step 101 is performed and the modem receives the pre-processing information, the time in this case, that is, a time at which the modem receives the pre-processing information, may be recorded. It should be noted that the time at which the modem receives the pre-processing information is merely used to reflect the receiving moment, and a representation form of the receiving moment is not limited in this embodiment of the present invention. For example, the receiving moment may be recorded as an $N^{th}$ cadence value according to a timing mechanism established inside the modem.

When a task specified by an application needs to periodically perform data sending, the preset functions may be invoked according to the timing mechanism established inside the modem, to perform period fitting, so that application programs whose application periods are approximate to periods of other original applications send and receive data as simultaneously as possible, so as to reduce overheads of the modem. In this embodiment of the present invention, the fitting is to uniformly integrate time points at which multiple applications send and receive data at dispersed time points, in different periods, and at different phases, so that the applications send and receive data as simultaneously as possible, so as to reduce a quantity of times of waking up a terminal and a quantity of times of establishing or tearing down a channel.

Specifically, when the task specified by the application needs to periodically perform data sending, the modem records a $T^{th}$ cadence value when the application receives the pre-processing information (The cadence value may be a timing method inside the modem. For example, an operating time is divided into several cadence values, and a time interval between adjacent cadence values is a fixed value); the first preset function is invoked according to the $T^{th}$ cadence value and the period range value n, to calculate a moment at which the application sends the first data, that is, a $K^{th}$ cadence value; finally, the modem invokes the second preset function according to the period range value n, to calculate the sending period P of the application. The second preset function and the first preset function have a same decomposition factor, to ensure that period tasks of different period range values are triggered at a same moment, which can fit periods of the period tasks to the maximum extent and reduce a quantity of times of wake-up. A specific method for performing period fitting on applications by the modem according to the period range value is described in detail in Embodiment 2, and therefore, details are not described herein again.

: The modem sends the first data to a server according to the sending time.

Specifically, the modem periodically sends the first data to the server according to the sending period determined in step starting from the sending moment determined in step 102.

Exemplarily, if a moment corresponding to a cadence value K determined in step 102 arrives, the modem encapsulates the first data in a preset TCP/IP protocol stack of the modem, and further sends, by using a 3GPP protocol stack, the encapsulated first data to the server according to the sending period P determined in step 102, so as to complete a data transceiving task when the application performs a data service, thereby both reducing a quantity of times of waking up the AP and reducing power consumption of the terminal device.

This embodiment of the present invention provides a data transceiving method, where a modem receives pre-processing information, which is sent by an AP, of an application, the pre-processing information includes at least a period range value and first data that are of the application, the period range value is used to represent frequency at which the application needs the AP to send and receive the first data, and the first data is data that the application needs the AP to send to a server; and then invokes preset functions according to the period range value and a time at which the modem receives the pre-processing information, to determine a sending time of the first data; and finally, the modem sends the first data to the server according to the sending time. In this solution, the pre-processing information, which is sent by the AP, of the application is received, and a general control such as a TCP/IP protocol stack is transferred in the modem, so that the modem replaces the AP to perform pre-processing on a period data service and performs fitting on transceiving periods of applications in the modem. Therefore, applications having approximate transceiving periods send and receive data as simultaneously as possible, thereby greatly reducing a quantity of times of waking up the AP, further reducing power consumption of the AP, and reducing power overheads of a terminal device.

Embodiment

Figure 2:
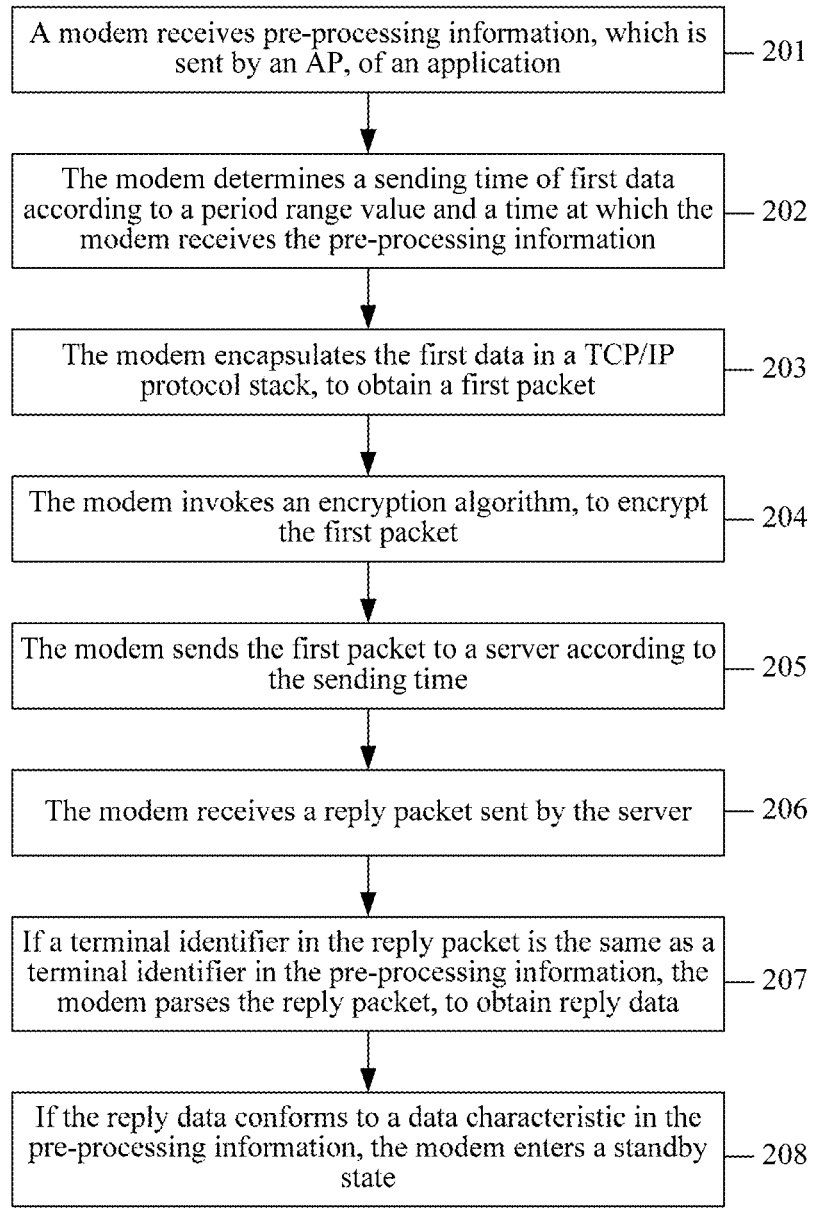
FIG. 2 is a schematic flowchart 2 of a data transceiving method according to an embodiment of the present invention.

An embodiment of the present invention provides a data transceiving method, as shown in FIG. 2, including:

201: A modem receives pre-processing information, which is sent by an AP, of an application.

The pre-processing information includes at least a period range value and first data that are of the application, the period range value is used to represent frequency at which the application needs the AP to send and receive the first data, and the first data is data that the application needs the AP to send to a server. The period range value may be represented by n, and a value of n may range from 0 to 10. The first data specifically includes a data packet that a task of an application needs to send each time.

Specifically, each time when a sending moment of the first data arrives, the modem packetizes data according to the first data and a communications protocol and sends a first packetized packet to a peer server. The pre-processing information may further include a terminal identifier and a data characteristic that are of a terminal device corresponding to the modem, and the data characteristic is an expected characteristic of data with which the server replies to the first data.

After a reply packet sent by the server is received, the terminal identifier is used by the modem to determine, according to the terminal identifier, whether the terminal identifier is the same as a terminal identifier in the reply packet sent by the server, and further depacketization is performed in an IP protocol stack to receive reply data. After the data characteristic is used by the modem to send the first data, the modem waits to receive the reply packet with which the server replies, and compares content of the received reply packet with the data characteristic in the pre-processing information. If the content of the reply packet conforms to the data characteristic, it shows that a task indicated by the sent first data is successfully executed, the AP does not need to be woken up, and the modem may directly enter a standby state; and if the content of the reply packet does not conform to the data characteristic, or no response is received, the modem wakes up the AP and notifies the AP that processing of the application program is abnormal. It should be noted that the data characteristic may be merely some data indicators. If the content of the reply packet conforms to the data indicators, it is considered that the content of the reply packet conforms to the data characteristic. The data characteristic may be some pieces of key information. If the content of the reply packet includes the key information, it is considered that the content of the reply packet conforms to the data characteristic. The data characteristic may further be a piece of entire data content. If the content of the reply packet is completely the same as the data characteristic, it is considered that the content of the reply packet conforms to the data characteristic.

202: The modem determines a sending time of first data according to a period range value and a time at which the modem receives the pre-processing information.

The sending time includes a sending moment and a sending period. The sending moment refers to a time point when the first data is sent for the first time. The sending period refers to the sending period by which the first data is periodically sent after the first data is sent for the first time.

Assuming that a timing method inside the modem is to perform timing in a form of a cadence value, that is, dividing an operating time inside the modem into several cadence values. A time interval between adjacent cadence values is a fixed value. Specifically, for example, if twelve o'clock is a first cadence value, and the time interval between adjacent cadence values is one minute, one minute past twelve o'clock is a second cadence value. When data sending needs to be periodically performed on the task specified by the application, the modem records a $T^{th}$ cadence value when the application receives the pre-processing information; and invokes the first preset function according to the $T^{th}$ cadence value and the period range value n, to calculate a sending moment at which the first data is sent for the first time, that is, a $K^{th}$ cadence value; finally, the modem invokes the second preset function according to the period range value n, to calculate the sending period P by which the first data is sent. The second preset function and the first preset function have a same decomposition factor, to ensure that period tasks of different period range values are triggered at a same moment, which can fit periods of the period tasks to the maximum extent and reduce a quantity of times of wake-up.

Figure 3:
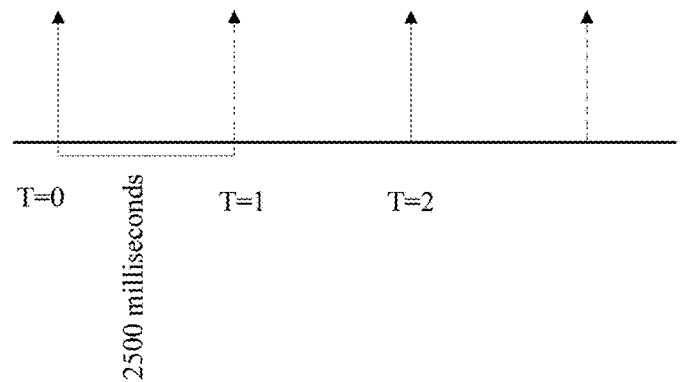
FIG. 3 is a schematic diagram 1 of a period fitting method according to an embodiment of the present invention.

Exemplarily, after initialization of a terminal is completed, the modem counts cadences according to a pace of waking up the modem every 2500 ms, that is, a time interval between adjacent cadence values is 2500 ms (millisecond). As shown in FIG. 3, if a task 1 specified by a first application creates a period (5000 milliseconds are a period) task, the modem responds, organizes packet transceiving according to the period of 5000 milliseconds and performs heartbeat, that is, every two cadence values are used as one period to send and receive data.

Figure 4:
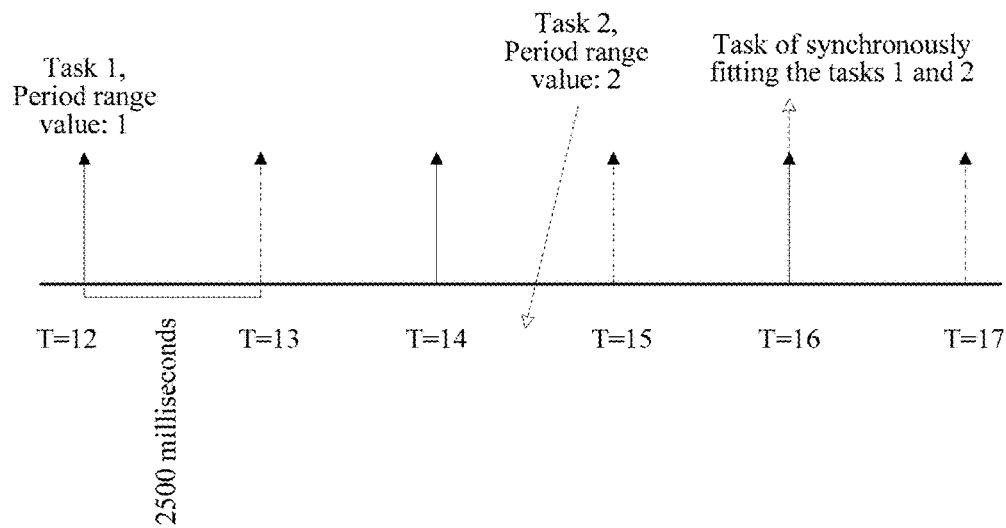
FIG. 4 is a schematic diagram 2 of a period fitting method according to an embodiment of the present invention.

Further, as shown in FIG. 4, when periodical data transceiving need to be performed on a task (task 2) specified by an application, the modem records the $T^{th}$ cadence value (T=14) of the application, and invokes the first preset function according to the $T^{th}$ cadence value and the period range value n, to calculate the sending moment at which the application sends the first data for the first time, that is a $K^{th}$ cadence value. When the $K^{th}$ cadence value arrives, the modem sends the first data for the first time, where the first preset function is:

$$F1=[1=\text{Floor}(T/2^n)]*2^n$$

where n is the period range value of the application; T is the cadence value; and Floor is an operation of rounding down to the nearest integer. Assuming that a value of T is 14 and n is 2, Floor[14/4]=3 and F1=(1+3)*4=16. In this case, the cadence value of the application is K=F1=16, that is, the sending moment of the first data is a time point corresponding to a $^{th}$ cadence value.

Still further, the modem invokes the second preset function according to the period range value n, to calculate the sending period P of the application, and the second preset function and the first preset function have a same decomposition factor.

Exemplarily, the second preset function $F2=A*2^n$, where A is a period coefficient, and 2500 ms is used as an example in this embodiment; and n is the period range value. For example, if n2=, F2=2500*4=10000 ms. In this case, the sending period of the first data is P=F2=10000 ms.

Figure 5:
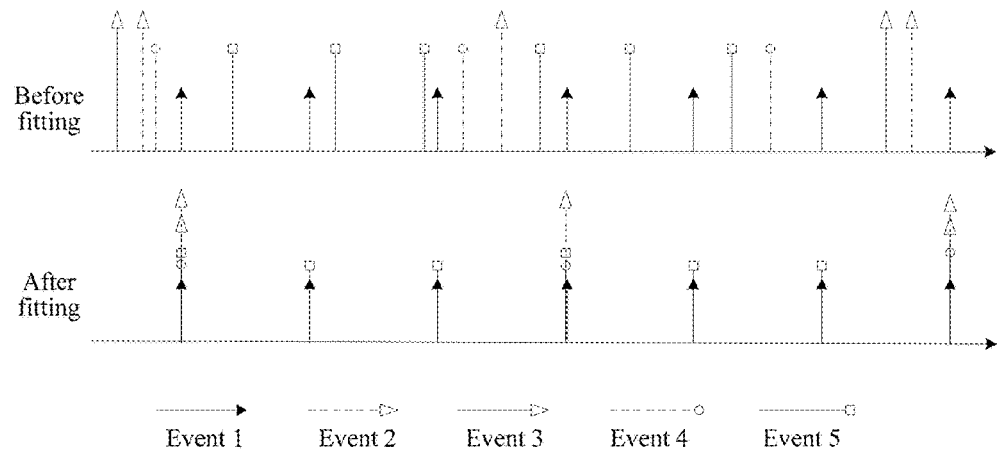
FIG. 5 is a schematic diagram 3 of a period fitting method according to an embodiment of the present invention.
Figure 6:
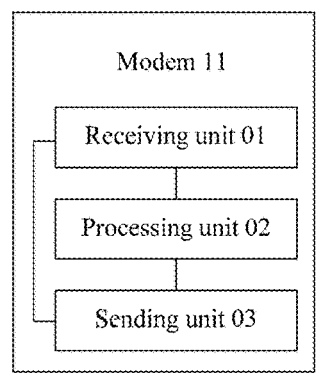
FIG. 6 is a schematic structural diagram 1 of a modem according to an embodiment of the present invention.

According to the foregoing method, as shown in FIG. 5, when different applications are added, the modem adds tasks having different starting sending moments (that is, the cadence value K) and different sending periods P. Because the K value and the P value both use $2^n$ as the decomposition factor, it ensures that period tasks of different period ranges are triggered at a moment of $2^n$, which can fit periods of the period tasks to the maximum extent, and further reduce a quantity of times of waking up the modem.

So far, according to the foregoing method, the modem determines the sending moment and the sending period of the first data according to the period range value and the time at which the modem receives the pre-processing information.

203: The modem encapsulates the first data in a TCP/IP protocol stack, to obtain a first packet.

A general control such as a TCP/IP protocol stack is transferred in advance in the modem, so that the modem has capabilities, which the AP has, of packetizing and depacketizing data. Therefore, the modem undertakes some work originally undertaken by the AP, to further perform work such as regular sending, answer pre-processing, and anomaly pre-processing on data on which packetization, which is initiated by the application program, is performed according to a fixed interval and a rule, so as to reduce a quantity of times of waking up the AP, thereby reducing overall power consumption of a terminal device.

Specifically, when the sending moment (that is, the cadence value K) arrives, the modem encapsulates the first data in the preset TCP/IP protocol stack of the modem and performs packetization, to obtain the first packet, so that the modem sends the first data to a corresponding server in a data packet form.

Further, after the modem encapsulates the first data in the TCP/IP protocol stack, step 204 may be further performed, to perform encryption processing on the first data.

204: The modem invokes an encryption algorithm, to encrypt the first packet.

205: The modem sends the first packet to a server according to the sending time.

Specifically, the modem periodically sends, by using a 3GPP protocol stack, the first packet to the server according to the sending period starting from the sending moment.

Correspondingly, if step 204 is performed, the modem periodically sends, by using the 3GPP protocol stack, the encrypted first packet to the server according to the sending period starting from the sending moment.

206: The modem receives a reply packet sent by the server.

Specifically, after sending the first data to the corresponding server, the modem waits to receive the reply packet sent by the server, where the reply packet is generated after the server parses the first data.

A timer or another timing apparatus may be built in the modem. If the reply packet sent by the server is not received within a preset time, the modem generates program processing anomaly information of the application and sends the program processing anomaly information to the AP, so that the AP analyzes the program processing anomaly information and gives an indication.

207: If a terminal identifier in the reply packet is the same as a terminal identifier in the pre-processing information, the modem parses the reply packet, to obtain reply data.

Specifically, after the modem receives the reply packet sent by the server, the modem determines whether the terminal identifier in the reply packet is the same as a local port number. If the terminal identifier in the reply packet is the same as the local port number, the modem may parse the reply packet in the TCP/IP protocol stack, to obtain the reply data; or if the terminal identifier in the reply packet is different from the local port number, the modem may send the reply packet to the AP for further processing.

208: If the reply data conforms to a data characteristic in the pre-processing information, the modem enters a standby state.

Specifically, if the terminal identifier in the reply packet is the same as the terminal identifier, the modem parses the reply packet, to obtain the reply data. The modem determines whether the reply data conforms to the data characteristic in the pre-processing information. If the reply data conforms to the data characteristic in the pre-processing information, the modem does not need to wake up the AP and directly enters the standby state; or if the reply data does not conform to the data characteristic in the pre-processing information, the modem generates the program processing anomaly information of the application and sends the program processing anomaly information to the AP.

The data characteristic may be merely some data indicators. If content of the reply packet conforms to the data indicators, it is considered that the content of the reply packet conforms to the data characteristic. The data characteristic may be some pieces of key information. If the content of the reply packet includes the key information, it is considered that the content of the reply packet conforms to the data characteristic. The data characteristic may further be a piece of entire data content. If the content of the reply packet is completely the same as the data characteristic, it is considered that the content of the reply packet conforms to the data characteristic.

So far, the modem replaces the AP to complete work such as regular sending, answer pre-processing, and anomaly pre-processing on data on which packetization, which is initiated by the application, is performed according to a fixed interval and a rule.

This embodiment of the present invention provides a data transceiving method, where a modem receives pre-processing information, which is sent by an AP, of an application, the pre-processing information includes at least a period range value and first data that are of the application, the period range value is used to represent frequency at which the application needs the AP to send and receive the first data, and the first data is data that the application needs the AP to send to a server; and then, invokes preset functions according to the period range value and a time at which the modem receives the pre-processing information, to determine a sending time of the first data; and finally, the modem sends the first data to the server according to the sending time. In this solution, the pre-processing information, which is sent by the AP, of the application is received, and a general control such as a TCP/IP protocol stack is transferred in the modem, so that the modem replaces the AP to perform pre-processing on a period data service and performs fitting on transceiving periods of applications in the modem. Therefore, applications having approximate transceiving periods send and receive data as simultaneously as possible, thereby greatly reducing a quantity of times of waking up the AP, further reducing power consumption of the AP, and reducing power overheads of a terminal device. In addition, the quantity of times of waking up the AP is reduced, so that usage of the AP is decreased, thereby improving a running speed of the terminal device.

Embodiment 3

An embodiment of the present invention provides a modem , as shown in FIG. , including:

a receiving unit , configured to receive pre-processing information, which is sent by an application processor AP, of an application, where the pre-processing information includes at least a period range value and first data that are of the application, the period range value is used to represent frequency at which the application needs the AP to send and receive the first data, and the first data is data that the application needs the AP to send to a server;

a processing unit 02, configured to invoke preset functions according to the period range value in the receiving unit 01 and a time at which the receiving unit 01 receives the pre-processing information, to determine a sending time of the first data; and a sending unit , configured to send the first data in the receiving unit 01 to the server according to the sending time determined in the processing unit .

Further, the processing unit 02 is specifically configured to record the time at which the receiving unit 01 receives the pre-processing information; invoke a first preset function according to the time and the period range value in the receiving unit , to determine a sending moment; and invoke a second preset function according to the period range value in the receiving unit 01, to determine a sending period.

The preset functions include the first preset function and the second preset function; and the sending time includes the sending moment and the sending period, where the first preset function is used to determine the sending moment, the second preset function is used to determine the sending period, and the second preset function and the first preset function have a same decomposition factor.

Further, the sending unit 03 is specifically configured to periodically send the first data in the receiving unit to the server according to the sending period starting from the sending moment determined by the processing unit 02.

Figure 7:
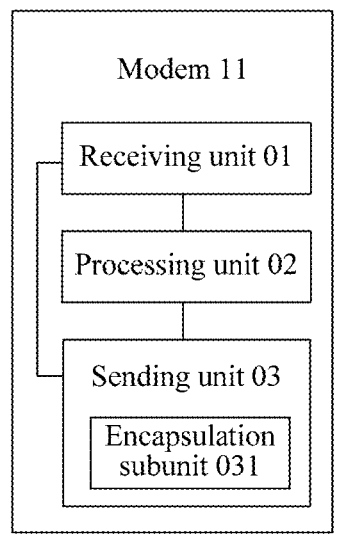
FIG. 7 is a schematic structural diagram 2 of a modem according to an embodiment of the present invention.

Further, as shown in FIG. 7, the sending unit 03 further includes an encapsulation subunit 031.

The encapsulation subunit 031 is configured to encapsulate the first data in a TCP/IP protocol stack, to obtain a first packet.

The sending unit 03 is specifically configured to periodically send, by using a 3GPP protocol stack, the first data in the receiving unit 01 to the server according to the sending period starting from the sending moment determined by the processing unit 02.

Figure 8:
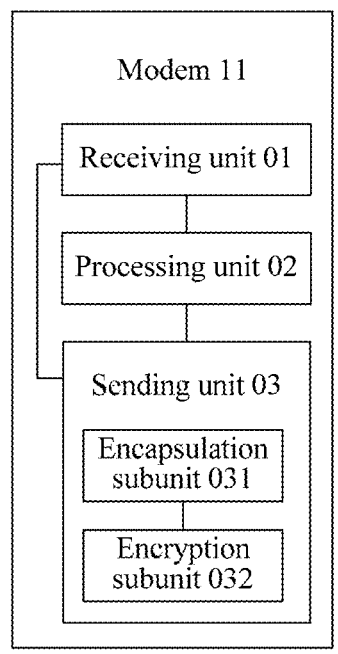
FIG. 8 is a schematic structural diagram 3 of a modem according to an embodiment of the present invention.

Further, as shown in FIG. 8, the sending unit 03 further includes an encryption subunit 032.

The encryption subunit 032 is configured to invoke an encryption algorithm, to encrypt the first packet in the encapsulation subunit 031.

Further, the receiving unit 01 is further configured to receive a reply packet sent by the server, where the reply packet is generated after the server parses the first data.

The processing unit 02 is further configured to: if a terminal identifier in the reply packet is the same as the terminal identifier, parse the reply packet in the receiving unit 01, to obtain reply data; and if the reply data conforms to a data characteristic, enter a standby state.

The pre-processing information further includes a terminal identifier and a data characteristic that are of a terminal device corresponding to the modem, and the data characteristic is an expected characteristic of data with which the server replies to the first data.

Further, the sending unit 03 is further configured to: if the terminal identifier in the reply packet is different from the terminal identifier, send the reply packet in the receiving unit to the AP.

Further, the processing unit 02 is further configured to: if the reply data does not conform to the data characteristic, generate first anomaly information of the application.

The sending unit 03 is further configured to send the first anomaly information in the processing unit to the AP.

Further, the processing unit 02 is further configured to: if the reply packet sent by the server is not received within a preset time, generate second anomaly information of the application.

The sending unit 03 is further configured to send the second anomaly information in the processing unit to the AP, where the reply packet is generated after the server parses the first data.

This embodiment of the present invention provides a modem, where the modem receives pre-processing information, which is sent by an AP, of an application, the pre-processing information includes at least a period range value and first data that are of the application, the period range value is used to represent frequency at which the application needs the AP to send and receive the first data, and the first data is data that the application needs the AP to send to a server; and then, invokes preset functions according to the period range value and a time at which the modem receives the pre-processing information, to determine a sending time of the first data; and finally, the modem sends the first data to the server according to the sending time. In this solution, the pre-processing information, which is sent by the AP, of the application is received, and a general control such as a TCP/IP protocol stack is transferred in the modem, so that the modem replaces the AP to perform pre-processing on a period data service and performs fitting on transceiving periods of applications in the modem. Therefore, applications having approximate transceiving periods send and receive data as simultaneously as possible, thereby greatly reducing a quantity of times of waking up the AP, further reducing power consumption of the AP, and reducing power overheads of a terminal device. In addition, the quantity of times of waking up the AP is reduced, so that usage of the AP is decreased, thereby improving a running speed of the terminal device.

Embodiment 4

Figure 9:
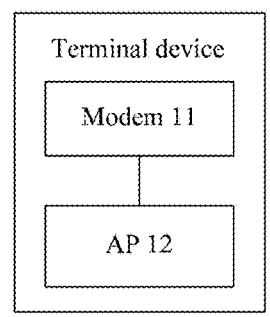
FIG. 9 is a schematic structural diagram of a terminal device according to an embodiment of the present invention.

An embodiment of the present invention provides a terminal device. As shown in FIG. 9, the terminal device includes the modem 11 described in Embodiment 3 and an AP 12 connected to the modem.

The modem 11 is configured to receive pre-processing information, which is sent by the AP, of an application. The pre-processing information includes at least a period range value n, first data, and a sending address that are of the application; perform period fitting on the application according to the period range value n, to determine a $K^{th}$ cadence value and a sending period P that are of the application; and send the first data to a corresponding server at the $K^{th}$ cadence value according to the sending address and according to the sending period P.

The AP 12 is configured to send the pre-processing information of the application to the modem.

Further, the modem 11 is further configured to receive the reply packet sent by the server; if a destination port number in the reply packet matches a local port number, parse the reply packet in the TCP/IP protocol stack, to obtain parsed data; and if the parsed data conforms to an expected condition in content of the expected received packet, entered a standby state.

Further, the AP 12 is further configured to: if the destination port number in the reply packet does not match the local port number, receive the reply packet; if the parsed data does not conform to the expected condition in the content of the expected received packet, receive program processing anomaly information, which is sent by the modem, of the application; and if the reply packet sent by the server is not received within a preset time, receive the program processing anomaly information, which is sent by the modem, of the application.

Figure 10:
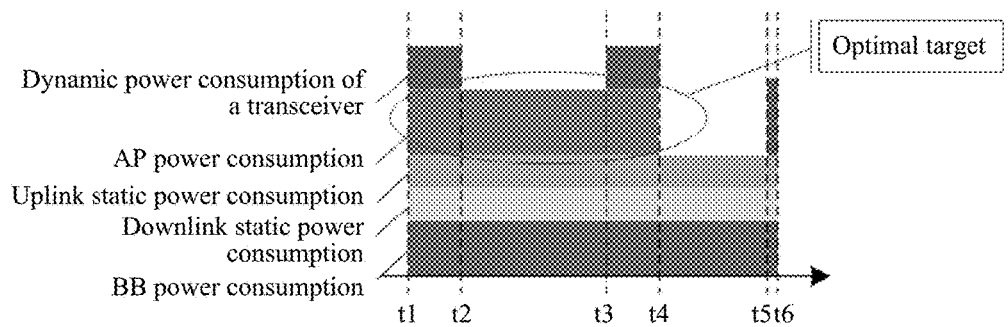
FIG. 10 is a schematic diagram of power consumption comparison between a terminal device provided in an embodiment of the present invention and a terminal device in the prior art.

Exemplarily, as shown in FIG. 10, a period by which the AP is woken up once to process transceiving of the first data is used as an example (email transceiving is used as an example). Power consumption of the AP has a relatively high proportion in the period. If a data transceiving method provided in an embodiment of the present invention is used, the modem replaces the AP to perform periodical data transceiving. In a case in which no anomaly occurs, some power consumption of the AP may be saved. Viewed from an actual test result, the power consumption of the AP on a Qualcomm (Qualcomm) platform is approximately 20 mA, and that on a Hisilicon (Hisilicon) platform is approximately 40 mA. Theoretically, power consumption of the terminal device when processing a transceiving service of wireless network data may be decreased by 10%.

In addition, various technologies described in this specification may be applied to various wireless communications systems, for example, current 2G and 3G communications systems and a next-generation communications system, for example, a Global System for Mobile (GSM), a Code Division Multiple Access (CDMA) system, a Time Division Multiple Access (TDMA) system, Wideband Code Division Multiple Access (WCDMA), a Frequency Division Multiple Access (FDMA) system, an Orthogonal Frequency Division Multiple Access (OFDMA) system, a single-carrier FDMA (SC-FDMA) system, a General Packet Radio Service (GPRS) system, a Long Term Evolution (LTE) system, and other such types of communications systems.

This embodiment of the present invention provides a terminal device, where a modem receives pre-processing information, which is sent by an AP, of an application, the pre-processing information includes at least a period range value and first data that are of the application, the period range value is used to represent frequency at which the application needs the AP to send and receive the first data, and the first data is data that the application needs the AP to send to a server; and then, invokes preset functions according to the period range value and a time at which the modem receives the pre-processing information, to determine a sending time of the first data; and finally, the modem sends the first data to the server according to the sending time. In this solution, the pre-processing information, which is sent by the AP, of the application is received, and a general control such as a TCP/IP protocol stack is transferred in the modem, so that the modem replaces the AP to perform pre-processing on a period data service and performs fitting on transceiving periods of applications in the modem. Therefore, applications having approximate transceiving periods send and receive data as simultaneously as possible, thereby greatly reducing a quantity of times of waking up the AP, further reducing power consumption of the AP, and reducing power overheads of a terminal device. In addition, the quantity of times of waking up the AP is reduced, so that usage of the AP is decreased, thereby improving a running speed of the terminal device.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transceiving method, wherein the method comprises:
receiving, by a modem, pre-processing information of an application, wherein the pre-processing information is sent by an application processor (AP), the pre-processing information comprises at least a period range value and first data of the application, the period range value represents a frequency at which the application requests to send or receive data, and the first data comprises data that the application requests to send to a server;
determining, by the modem, a sending moment based on a first preset function according to the period range value and a time at which the modem receives the pre-processing information;
determining, by the modem, a sending period based on a second preset function according to the period range value, wherein the second preset function and the first preset function have a same decomposition factor; and
sending, by the modem, the first data to the server according to a sending time, wherein the sending time comprises the sending moment and the sending period.

2. The method according to claim 1, further comprising:
recording, by the modem, the time at which the modem receives the pre-processing information.

3. The method according to claim 1, wherein the sending, by the modem, the first data to the server according to the sending time comprises:
periodically sending, by the modem, the first data to the server according to the sending period starting from the sending moment.

4. The method according to claim 3, wherein the sending, by the modem, the first data to the server according to the sending time comprises:
encapsulating, by the modem, the first data in a TCP/IP protocol stack, to obtain a first packet; and
periodically sending, by the modem and using a 3GPP protocol stack, the first packet to the server according to the sending period starting from the sending moment.

5. The method according to claim 4, wherein after the encapsulating, by the modem, the first data in the TCP/IP protocol stack, to obtain the first packet, the method further comprises:
invoking, by the modem, an encryption algorithm, to encrypt the first packet.

6. The method according to claim 1, wherein the pre-processing information further comprises a terminal identifier and a data characteristic that are of a terminal device corresponding to the modem, and the data characteristic is an expected characteristic of data with which the server replies to the first data; and
after the sending, by the modem, the first data to the server according to the sending time, the method further comprises:
receiving, by the modem, a reply packet sent by the server in response to the first data,
the reply packet includes a second terminal identifier that matches the terminal identifier, parsing, by the modem, the reply packet, to obtain reply data; and
if the reply data conforms to the data characteristic, entering, by the modem, a standby state.

7. The method according to claim 6, wherein after the receiving, by the modem, the reply packet sent by the server, the method further comprises:
if the reply packet includes a second terminal identifier that is different from the terminal identifier, sending, by the modem, the reply packet to the AP.

8. The method according to claim 6, wherein after the parsing, by the modem, the reply packet, to obtain reply data, the method further comprises:

if the reply data does not conform to the data characteristic, generating, by the modem, first anomaly information of the application, and sending the first anomaly information to the AP.

9. The method according to claim 1, wherein after the sending, by the modem, the first data to the server according to the sending time, the method further comprises:
if a reply packet in response to the first data is not received from the server within a preset time, generating, by the modem, second anomaly information of the application, and sending the second anomaly information to the AP.

10. A modem, comprising:
a receiver, configured to receive pre-processing information of an application, wherein the pre-processing information is sent by an application processor (AP), the pre-processing information comprises at least a period range value and first data that are of the application, the period range value represents a frequency at which the application requests to send or receive data, and the first data comprises data that the application requests to send to a server;
a processor, configured to:
determine a sending moment based on a first preset function according to the period range value and a time at which the modem receives the pre-processing information; and
determine a sending period based on a second preset function according to the period range value, wherein the second preset function and the first preset function have a same decomposition factor; and
a transmitter, configured to send the first data in the receiver to the server according to a sending time, wherein the sending time comprises the sending moment and the sending period.

11. The modem according to claim 10, wherein
the processor is configured to record the time at which the receiver receives the pre-processing information.

12. The modem according to claim 11, wherein
the transmitter is configured to periodically send the first data in the receiver to the server according to the sending period starting from the sending moment determined by the-processor.

13. The modem according to claim 12, wherein the transmitter further comprises an encapsulation subunit;
the encapsulation subunit is configured to encapsulate the first data in a TCP/IP protocol stack, to obtain a first packet; and
the transmitter is specifically configured to periodically send, by using a 3GPP protocol stack, the first packet in the receiver to the server according to the sending period starting from the sending moment determined by the processor.

14. The modem according to claim 13, wherein the transmitter further comprises an encryption subunit; and
the encryption subunit is configured to invoke an encryption algorithm, to encrypt the first packet in the encapsulation subunit.

15. The modem according to claim , wherein the pre-processing information further comprises a terminal identifier and a data characteristic that are of a terminal device corresponding to the modem, the data characteristic is an expected characteristic of data with which the server replies to the first data, and
the receiver is further configured to receive a reply packet sent by the server in response to the first data;
the processor is further configured to: if the reply packet includes a second terminal identifier that matches the terminal identifier, parse the reply packet in the receiver, to obtain reply data; and if the reply data conforms to a data characteristic, enter a standby state.

16. The modem according to claim 15, wherein
the transmitter is further configured to: if the reply packet includes a second terminal identifier that is different from the terminal identifier, send the reply packet in the receiver to the AP.

17. The modem according to claim 15, wherein
the processor is further configured to: if the reply data does not conform to the data characteristic, generate first anomaly information of the application; and
the transmitter is further configured to send the first anomaly information in the-processor to the AP.

18. The modem according to claim 11, wherein
the processor is further configured to: if a reply packet in response to the first data is not received from the server within a preset time, generate second anomaly information of the application; and
the transmitter is further configured to send the second anomaly information in the processor to the AP, wherein the reply packet is generated after the server parses the first data.

19. A terminal device, comprising:
an application processor (AP) configured to send pre-processing information of an application to a modem, the pre-processing information comprises at least a period range value and first data that are associated with the application, the period range value represents a frequency at which the application requests to send or receive data, and the first data comprises data that the application requests to send to a server; and
the modem configured to:
receive the pre-processing information;
determine a sending moment based on a first preset function according to the period range value and a time at which the modem receives the pre-processing information; and
determine a sending period based on a second preset function according to the period range value, wherein the second preset function and the first preset function have a same decomposition factor; and
send the first data to the server according to a sending time, wherein the sending time comprises the sending moment and the sending period.

20. The terminal device according to claim 19, wherein the modem is configured to:
record the time at which the modem receives the pre-processing information.

* * * * *

UNITED STATES PATENT AND TRADEMARK OFFICE
CERTIFICATE OF CORRECTION

PATENT NO. : 10,028,216 B2
APPLICATION NO. : 15/128091
DATED : July 17, 2018
INVENTOR(S) : Yu Deng, Konggang Wei and Yu Peng Page 1 of 1

It is certified that error appears in the above-identified patent and that said Letters Patent is hereby corrected as shown below:

On the Title Page

In Column 1, In Line 1, (Assignee), Delete "(CN")" and insert -- P.R. (CN) --, therefor.

In Column 2, In Line 1, (Attorney Agent or Firm), After "Fish" insert -- & --.

In Column 2, In Line 1, (Abstract), After "resolve" insert -- a --.

In the Claims

In Column 17, In Line 60, In Claim 15, delete "claim," and insert -- claim 11, --, therefor.

Signed and Sealed this
Eleventh Day of December, 2018

Andrei Iancu
*Director of the United States Patent and Trademark Office*